(No Model.)  T. F. WALKER.  3 Sheets—Sheet 1.
SHIP'S LOG.
No. 351,140.  Patented Oct. 19, 1886.
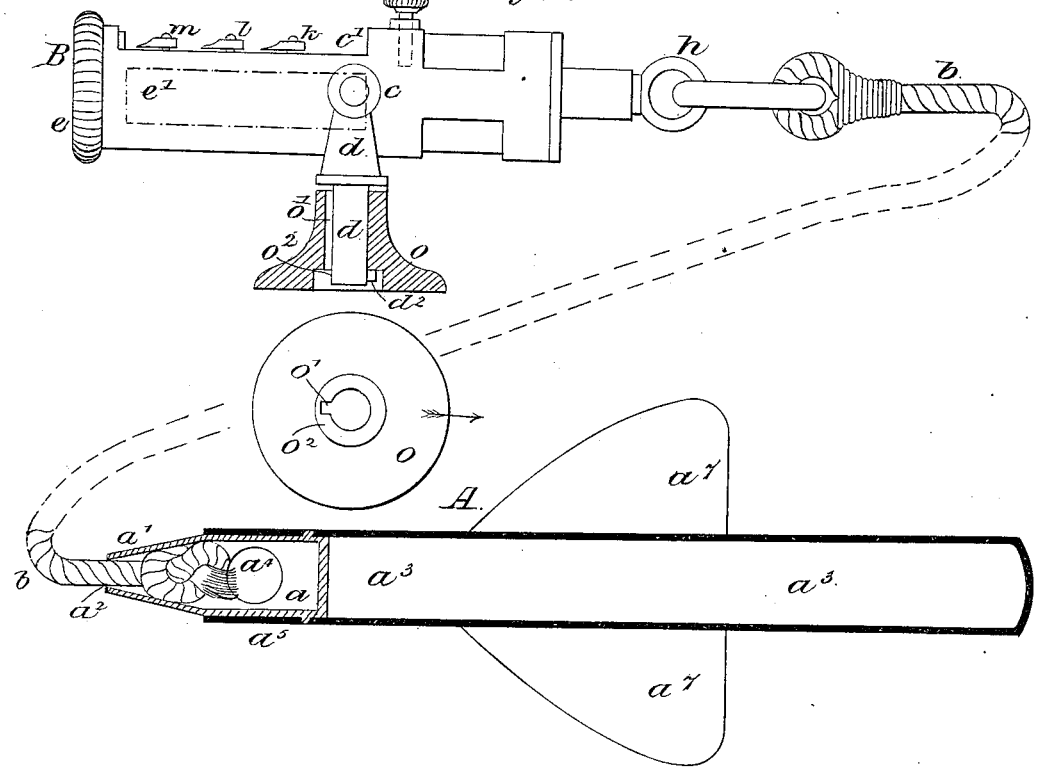
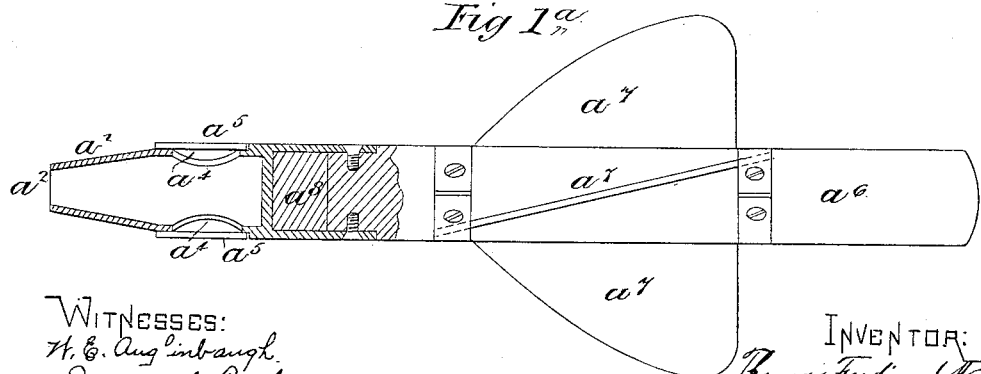
WITNESSES:
W. E. Auglinbaugh
Josiah Bedon
INVENTOR:
Thomas Ferdinand Walker
by John J. Halsted & Son
his Attys
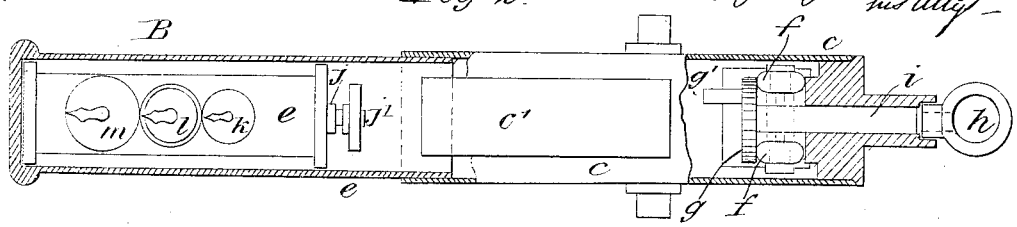

(No Model.) 3 Sheets—Sheet 2.

T. F. WALKER.
SHIP'S LOG.

No. 351,140. Patented Oct. 19, 1886.

WITNESSES:
H. E. Aughinbaugh.
Josiah Bedon

INVENTOR:
Thomas Ferdinand Walker
by John J. Halsted & Son
his Atty (No Model.) 3 Sheets—Sheet 3.

T. F. WALKER.
SHIP'S LOG.

No. 351,140. Patented Oct. 19, 1886.

WITNESSES:
W. E. Aughinbaugh.
Josiah Bedon

INVENTOR:
Thomas Ferdinand Walker
by John J. Halsted & Son
his Attys

UNITED STATES PATENT OFFICE.

THOMAS FERDINAND WALKER, OF BIRMINGHAM, COUNTY OF WARWICK, ENGLAND.

SHIP'S LOG.

SPECIFICATION forming part of Letters Patent No. 351,140, dated October 19, 1886.

Application filed June 23, 1885. Serial No. 169,561. (No model.) Patented in England April 15, 1884, No. 6,369.

*To all whom it may concern:*

Be it known that I, THOMAS FERDINAND WALKER, of Birmingham, in the county of Warwick, England, engineer, trading under the style or firm of Thomas Walker & Son, a subject of the Queen of Great Britain, have invented Improved Ship-Log Apparatus, (for which I have received Letters Patent in Great Britain, No. 6,369, dated April 15, 1884,) of which the following is a specification.

My invention has reference especially to that class of ship log in which the registering apparatus is inboard or on the taffrail of the vessel whose speed of progress through the water is being ascertained and the log or rotating implement, commonly called the "rotator," is in the water; and one part of my improvements consists in the mode of connecting to that rotating implement the rope or line which connects that rotator with the registering apparatus and conveys the rotation to the register.

In such rotating implements it is beneficial to their action in the water that the buoyancy of the rear ends thereof be maintained, and it is important to prevent any unnecessary or avoidable disturbance of the water at or friction on the fore end of the implement as it is drawn through the water from any such projections or obstructions as knots or other inequalities at or near to that fore end.

Figure 4:
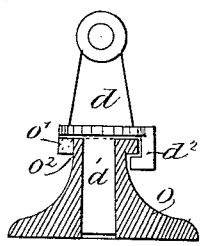
Figure 5:
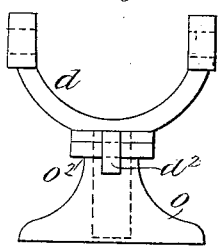
Figure 3:
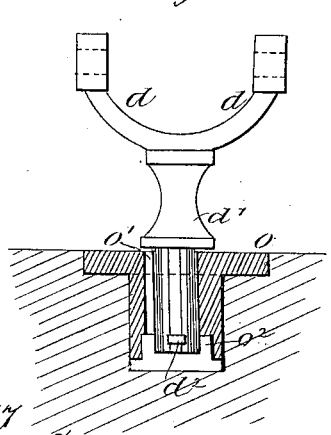
Figure 6:
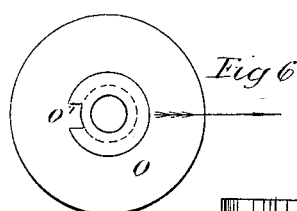
Figure 17:

Figure 1 is an elevation of my improved apparatus partly in section; Fig. 1ª, a section showing the knot-holding hollow chamber applied to a buoyant solid rotator; Fig. 2, a view showing the recording or registering apparatus partly withdrawn from the chamber or case; Fig. 3, a gimbal. Figs. 4, 5, and 6 are respectively sectional side or edge view, end view, and plan of gimbal and socket; Figs. 7, 8, 9, and 10, section and plan modifications or variations. Figs. 11, 12, 13, 14, and 15 show the case and its construction, so as to be capable of rotation on its axis; Fig. 16, a section of an inner and outer case, such as shown in Fig. 14; Fig. 17, side view, and Fig. 18 an edge view, of a hook for connecting the line to the registering apparatus.

In order to attain these objects I form in the fore end of the rotating implement, one of which is shown at A, Fig. 1, a hollow chamber, $a$, of contracted form toward its front end, $a'$, and having centrally of such contracted end an opening, $a^2$, into which is passed the tow-line $b$, and around the casing of this chamber $a$, parallel with the tube $a^3$ of the rotator, are provided one or more suitable circular openings, $a^4$, or other suitably-shaped holes, and through which the end of this tow-rope $b$ is capable of being passed and knotted and again withdrawn into the chamber, $a$ until, by the knot thus formed becoming locked or nipped inside the contracted end $a'$ of the chamber, that tow-line $b$ is securely connected and held firmly, so that the rotations are imparted thereto from the rotator A.

$a^5$ is a cylindrical band or sliding piece adapted to be slid over so as to close the opening or openings $a^4$, or to be passed from over those openings onto the tow-line, so as to leave free that opening $a^4$ for the protrusion of the end of the tow-line for knotting; or in place of the uncovering of the entrance to this chamber $a$ being effected by a longitudinal movement of the covering-band $a^5$, this band may be perforated with a hole or holes of similar size to that or those in the side wall of the chamber $a$, as shown at $a^4$, and access to the interior of that chamber may be had by bringing the hole or holes of the chamber coincident with the hole or holes of the covering-ring $a^5$ by a rotatory movement and the closing effected by the interspacing of the open parts of the covering and covered parts.

In Fig. 1ª I have shown my improved knot-holding hollow chamber applied to a rotator of solid material, of a light buoyant character in respect of its shaft $a^6$, and to which shaft are applied metal vanes $a^7$, as is well understood. $a^8$ indicates a portion of this shaft in rear of the hollow chamber, loaded, say, with lead, in order to give preponderance and proper sinkage to that end in the water. By such arrangements of these portions of a ship-log rotator I am enabled to secure the lightness of the aft end of the tube $a^3$ of the rotator A, when so formed, or for the same purpose to form such shaft more or less solid of a light buoyant material, preserving preponderance to the fore end, aided or not by special weighting, as at $a^8$, and at the same time to avoid any projecting parts or knots at the front end of the rotator to interfere with correct working thereof.

A further portion of my improvement in ship-log apparatus has reference to the chamber, shell, case, or frame carrying the first moving spindle and anti-friction rollers, which spindle receives and transmits the revolutions of the rotator to the registering or recording mechanism. This chamber $c$, (shown in Figs. 1 and 2, and which I call for convenience of reference hereinafter the "friction-chamber,") is carried by gimbals $d$ or other bearing parts attached to the ship; and the object of my improvement in this particular is to make the friction-chamber easily separable from the registering or recording mechanism $e$, so as, by withdrawing the part $e$ from within the part $c$, to expose and facilitate access to the friction-rollers $f$, which take and ease the pressure of the spindle $i$ imparted to the plate $g$, which, by the projecting pin or eccentric $g'$, moves the register-spindle arms $j'$, and thereby the wheels, which in turn move the dial-hands or the indicator $l$ $m$. These friction-rollers $f$ are interposed between the plate $g$ and the base of the chamber $c$, and they revolve in short axes radiating from a ring encompassing the spindle $i$, which spindle, by a loop, $h$, is connected to the tow-line $b$, and thereby to the rotator. This junction of the registering and recording portion of the mechanism B with the holding and rotating mechanism $c$ is effected by a frictional holding of that part B by the tubular part $c$, and it enables that part B to be simply slid or passed into $c$ until the projection or spindle $j'$ of the registering or recording mechanism engages the projection $g'$ on the enlarged end or plate $g$ in the friction-chamber $c$, and is thereby caused to partake of the rotatory movements conveyed thereto by the rotator-rope $b$ from the rotator in the water.

In order to secure the registering or recording mechanism from accidental or undesired disconnection from the friction-chamber $c$, into which it is slid and held, a spring-catch or a screw-stop, $n$, or other retainer or stop, is found to be convenient for connecting these two portions B and $c$ together, while for separation it can be readily withdrawn, admitting of the registering or recording mechanism being instantly removed and the anti-friction or roller-bearings and the recorder or register at once exposed to view, so as to be accessible for cleaning, oiling, or other purpose, instead of having to employ skilled labor in order to effect such separation of the parts of logs for like purposes, as is the case generally in existing logs, where those two parts become, by the nature of their connection, practically, fixtures, and inseparable safely by unskilled hands, and access to the revolving parts for supply or replenishment of lubricant has to be effected by means of a small hole, with consequent inconvenience.

In order to facilitate the examination of the anti-friction rollers, I cut away suitable portions of the friction-chamber and also of the case containing the registering wheel-work in such manner as that when the recorder or register portion B is slid into the friction-chamber $c$ it is practicable to expose the anti-friction rollers by a rotatory or sliding movement, and the registering or recording mechanism may in a similar way be exposed by bringing a similar opening in its case out beyond the friction chamber $c$ for inspection, by a longitudinal movement or by turning the inner recording mechanism until, by an aperture such as is indicated by the broken lines $e'$ in the case $e$ being brought more or less coincident with a portion, $c$, cut away in the case $e$, that wheel-work is rendered accessible.

In various emergencies in nautical operations it is very desirable to have no avoidable projections from the taffrails or other parts of the vessels, and this is so, for instance, in fishing-boats, when the nets may suddenly be swept around, and any projection might tear them or catch; and another portion of my improvements in ship-log apparatus has reference to support from the register or recorder holder on the ship's side or other part, and has for its object the easy and rapid removal of the gimbal from its socket, shoe, or other fixture or hold attached to or carried by the ship. This object I attain, as shown in Fig. 3, by the gimbal $d$ having its spindle $d'$ formed with a projection, $d^2$, which passes down into a slot, $o'$, in the socket $o$ and under a projecting ledge, $o^2$, running concentrically with the spindle $d'$, so that by turning that spindle on its axis the projection $d^2$ locks the spindle in its socket $o$, while still allowing it to rotate with freedom in such manner that by fixing the socket with the entering-slot $o'$ inboard the removable apparatus would have to be turned round a complete half-circle in its holder from its normal position when at work before, by the projection $d^2$ coming coincident with the entrance-slot $o'$, that projection $d^2$, by passing out, thereby releases the apparatus from its socket.

In cases when the greater or less projection of the socket portion of the appliance from the clear line of the vessel to which it is supplied is not so material, the arrangement of such parts indicated in Fig. 1 may be used, or these parts may be arranged, as shown in Figs. 4, 5, and 6, by sectional side, edge, or end and plan view of socket with the gimbal in place therein in the two former of these figures. In this modification the projection $d^2$ engages with the projecting ledge $o^2$, and is released or applied at the slot $o'$. In this and other of these figures the arrows indicate the direction of strain normally of the tow-line $d$. Figs. 7 and 8 and Figs. 9 and 10 indicate by section and plan modifications in this portion of the invention adapted to arrangements wherein the socket $q$, which receives the spindle $d'$, is retained by a separate fixture, $p$, attached to the ship, and into which fixture it is separately inserted and left capable of rotating, or is fixed by pinning. I make this fixture $p$, by preference, of flat plate form, as shown in these figures, recessed on its under side, $p'$, and for insertion of the socket $q$. Access to this recess $p'$ is obtained for the projection $q^2$ by means of a central hole, $p^2$, with enlargement or slot at one side somewhat similar in its form to some key-holes, and the lower part, $q^2$, of this socket $q$ conforms in shape to its slotted opening $p^2$, so that this socket, which is inserted, can be passed in and turned like a key.

Figure 8:
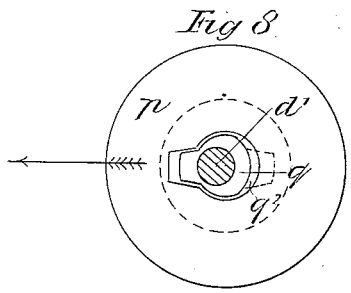
Figure 10:
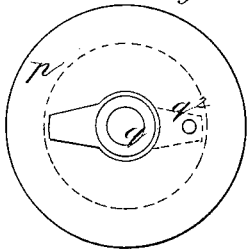
Figure 7:
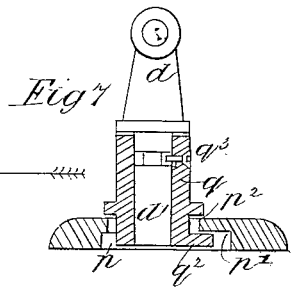
Figure 9:
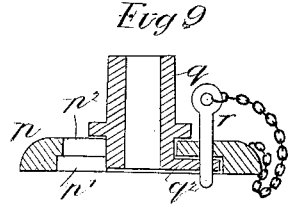

In Figs. 7 and 8 is shown a form of socket adapted to be inserted with the spindle $d'$ of the gimbal $d$, central of the opening $p^2$, and then turned about one-half revolution; but its normal position under the strain from the rotator is to be drawn toward and locked against one side of such opening, as indicated. In Figs. 9 and 10 this locking of the projection $q^2$, after having described one-half circle or revolution, is effected by a pin, $r$, passed through the fixture $p$ and projection $q^2$ on the side opposite to the opening $p^2$; or this locking may be effected by a part of the socket passing, when pulled or pushed sidewise, partly into the slot $p^2$, while in each case the freedom of rotation preserved for the gimbal $d$ is unimpaired by reason of the spindle $d'$ thereof being left free to turn in the socket, and it is retained from rising out by a pin or screw engaging in a recess at $q$, or by an equivalent retaining device. As a security against loss by letting go of the apparatus on detachment from its connection to the ship, the gimbal-socket $q$ may be attached to the vessel by a line either passed around it or through a ring fixed to it, or by like means to hold the gimbal-support from dropping away overboard.

The case containing the registering or recording mechanism is so constructed in Figs. 11, 12, 13, 14, and 15 as to be capable of being rotated on its axis inside the friction-chamber, so that the dials shall be caused to face in any required direction, and the dials can also be held in the frame that supports the casing, so as to enable them to be read conveniently, whatever be their situation at work.

Commonly, ship-log registering apparatus hung in slings on the taffrail are hung at the stern, when no great difficulty is experienced in getting access to the dials; but this position of hanging at the stern has the serious disadvantage of being inimical to the best operation of the machine, because it brings the log within the disturbing influences of the wake of the vessel.

One particular object I have in view is to adapt registering ship-logs to be readily and efficiently used when slung or hung from spars or other parts projecting from a vessel's side, so as to throw the log out in a line clear of the disturbing effects of the wake, as well as to enable the log to be worked with a much shorter length of line and for other advantages. Consequent upon such situation of the log at the side of the vessel from which its dial is to be read it is necessary to make provision for such dial to be turned toward the vessel at whichever side the log may be in use for the time being, and for easily changing the side toward which the dial shall face as the log is changed from one side to another.

Figure 11:
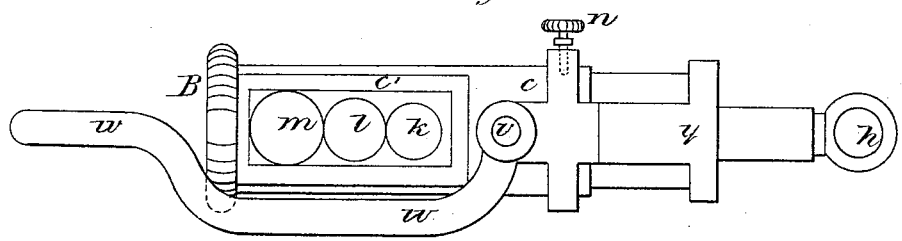
Figure 12:
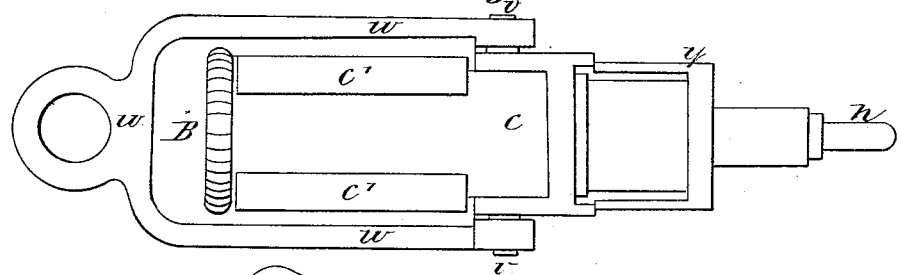
Figure 13:
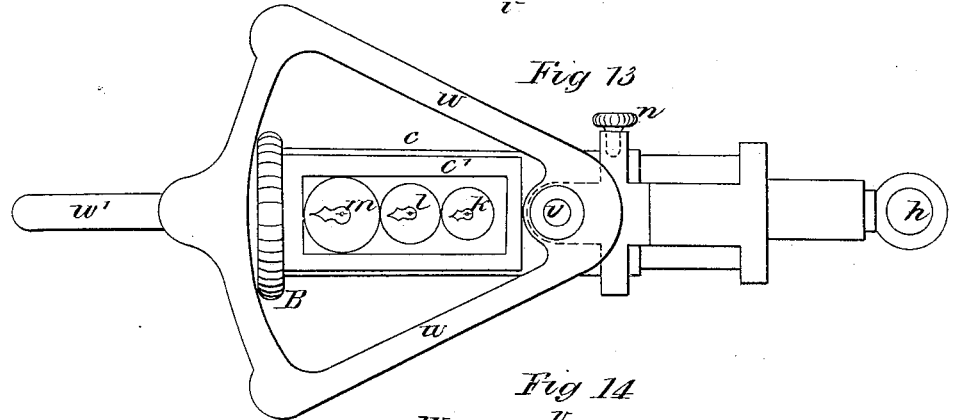
Figure 14:
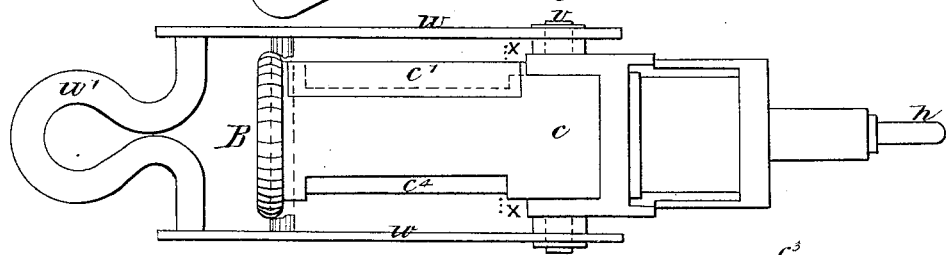

When it is preferred to employ a sling instead of a gimbal to retain the instrument at the side of the vessel, I make the metallic sling $w$, or substitute for the gimbal, of such a cranked form as is indicated by plan and side views, respectively, at Figs. 11 and 12, or bent into loop form $w$, as shown in Figs. 13 and 14 by corresponding views, so as thereby to permit of the dial being freely inspected from either side of the instrument, according as the circumstances of the case may require the log to be run out from one or other side of the ship, and the dials will be correspondingly adjusted, so that they fall inboard. This change of direction for the dial to face I effect in the arrangement shown in Figs. 11 and 12, by simply grasping and turning the milled end of that dial-case B, thereby turning that inner dial-case half around within the outer dials, and fingers coincident with one of the openings or transparent portions, $c'$, of the outer case, $c$, which openings are arranged on reverse sides thereof. In this arrangement, as shown, access to the dials for setting the hands at starting a run may be obtained by releasing the inner circle, B, by unscrewing the holding-screw $n$, and partially withdrawing the inner circle or registering-chamber from the friction-chamber $c$. In the arrangement shown by Figs. 13 and 14 the turning of the dial of the log to be slung toward the side of the vessel may be effected by reversing the whole register mechanism, together with its supporting-frame $w$, as the loop form of that double frame admits of inspection of the dials during oscillation of the registering apparatus on the trunnions or centers $v$ equally well, whichever side of the frame be uppermost, and the reversal in conformity to circumstances will bring the dials facing toward the ship.

Figure 15:
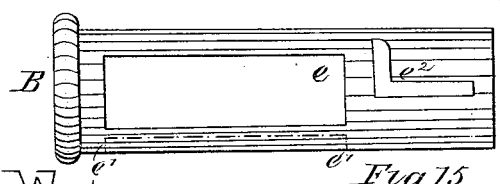
Figure 16:
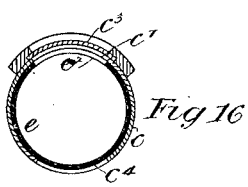

To enable the wheel-work of the registering mechanism, which operates the dials at $k\ l\ m$, to be got at readily for oiling, the register-tube $e$, Fig. 1, may be cut away at a suitable part—such as indicated by the broken lines $e'$—whereby that tube $e$ may be turned, so that that opening $e'$ may expose the wheel-work through the opening $c'$ when those openings are coincident, or through another opening specially provided in the outer case, $c$. Another way of effecting this is to wholly or partly withdraw the inner or registering chamber until through this hole $e'$ the wheel-work is exposed.

Where it is desirable to prevent separation of the inner register-tube, $e$, and the outer friction-tube, $c$, I form the tube $e$ with a slot, $e^2$, into which the pin or screw $n$ passes, and limits the travel of the tube $e$ longitudinally for withdrawal, and rotatively for covering or uncovering the dials, (and also the oiling opening, when such is made accessible also by rotation and the slot modified accordingly,) as shown by a separate view of a tube, $e$, at Fig. 15.

In order to strengthen the construction of the outer metal case or friction-chamber which holds the registering-wheel work and dials, I sometimes vary that construction by making the outer case in two parts, as is indicated by Figs. 11 and 12, one part, $c$, may slide or be passed within and be secured by any convenient fastening—such as the screw, $n$, for instance—to an outer frame-piece or socket, $y$, which is pivoted at $v$ to the sling or frame $w$; or it may be arranged to work in a gimbal and socket, and this outer frame-piece takes the strain of the tow-line, and by so taking the strain relieves the register-holding case $c$ therefrom, and this variation of the construction is shown applied in Figs. 11, 12, 13, and 14.

Fig. 16 shows a section of an inner and outer case, $e$ and $c$—such as Fig. 14—supposed to be taken at about the line $x\ x$ of that figure, by which it will be seen that the opening $e^2$ of the tube $e$ can be brought coincident with either the opening $c'$, protected by the glass $c$, or the opening $c^4$, not covered. This arrangement affords means of easy and speedy access to the dials to set the hands or indicators at starting.

Figure 18:
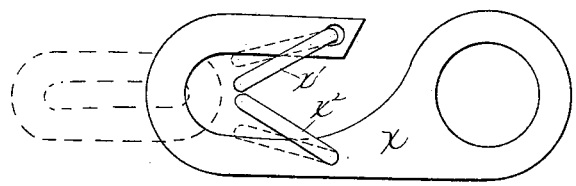

Fig. 17 shows by edge view, and Fig. 18 by side view, a form of hook for connecting the rotator tow-line to the register $h$, removably instead of permanently by a ring. The loops $x'\ x^2$ are pivoted opposite each other, so that their unattached or free ends will normally occupy a position nearly midway in the space within the hook, and these two loops also in their normal position will at their free ends act like two gates, nearly closing upon each other. This construction will permit of the passage in of the eye of the register-case, but prevents its accidental disconnection in whatever position the hook may be in. To remove the eye and disconnect the hook it is only necessary to press back the loops $x'\ x^2$.

I wish it to be understood that I am aware that rotator bodies or shafts have been formed hollow throughout their length, and the rope passed therethrough from end to end and knotted and redrawn thereinto and the knot nipped or held in the fore end; also, I am aware that a knot-chamber has as a separate device been inserted in the line of or connected with the tow-line in front of a rotator for the purpose of facilitating connection and disconnection of a rotator and its tow-line, and also that such chambers have been designed to reduce the friction of a loop, tie, or knot in the tow-rope; but such separate hollow knot-chamber in itself forms an inconvenient obstacle to the passage of the log-rotator through the water, and I make no claim thereto.

Having now particularly described and ascertained the nature of my said invention, and in what manner the same is to be performed, I declare that what I claim is—

1. A rotator for a ship-log, having a separate knot-chamber in its fore end, said chamber being open at its outer end for the admission of the end of the tow-rope, and having a side hole or holes, all substantially as and for the purposes set forth.

2. A rotator for a ship-log, having a separate knot-chamber in its fore end, said chamber being open at its outer end for the admission of the end of the tow-rope, and having a side hole or holes and an outer cover or casing, all substantially as and for the purposes set forth.

3. A rotator for a ship-log, having a separate knot-chamber in its fore end and loaded near the same, said chamber being open at its outer end for the admission of the end of the tow-rope, and having a side hole or holes, all substantially as and for the purposes set forth.

4. A rotator for a ship-log, having a separate knot-chamber in its fore end and loaded near the same, said chamber being open at its outer end for the admission of the end of the tow-rope, and having a side hole or holes, and an outer casing, all substantially as and for the purposes set forth.

5. In a ship-log apparatus having its registering mechanism on board, the combination of the registering-spindle $j$ and the spindle-arms $j'$, inclosed in the casing $e$, with the spindle and plate $i\ g$, the eccentric-pin $g'$, and the anti-friction rollers $f$, inclosed in the casing $c$, said combination serving to allow of the partial or entire separation of the part $e$ and its inclosed devices from the remainder of the apparatus without disturbing the same, all substantially as set forth.

6. In a ship-log apparatus, the combination of the gimbal and spindle $d\ d'$, substantially as shown and described, the socket $q$, having the projection $q^2$, and the fixture $p$, with its hole $p^2$ and recess $p'$, all combined and operating as shown and described.

7. In a ship-log apparatus, the combination of the crank or looped sling having sockets at one end, with the double-cased registering mechanism B $e\ c$, having transparent portions in the outer case, $c$, the inner casing containing the indicators, the trunnions $v$ on said outer casing, and the holding-screw $n$, the combination serving to facilitate inspection of the indicators, whether the log be run out from one or the other side of the ship, all substantially as set forth.

THOMAS FERDINAND WALKER.

Witnesses:
 EDWARD B. DILLON,
 EDWIN C. PELLOW.